(12) United States Patent
Hsu

(10) Patent No.: US 7,567,289 B2
(45) Date of Patent: Jul. 28, 2009

(54) AUTO FOCUS METHOD

(75) Inventor: Wei Hsu, Taipei (TW)

(73) Assignee: Primax Electronics Ltd., Taipei (TW)

(*) Notice: Subject to any disclaimer, the term of this patent is extended or adjusted under 35 U.S.C. 154(b) by 334 days.

(21) Appl. No.: 11/737,464

(22) Filed: Apr. 19, 2007

(65) Prior Publication Data

US 2008/0180563 A1   Jul. 31, 2008

(30) Foreign Application Priority Data

Jan. 26, 2007   (TW)   ................. 96102942 A

(51) Int. Cl.
*H04N 5/232*   (2006.01)

(52) U.S. Cl. ................. 348/345; 348/349; 348/347

(58) Field of Classification Search ................. 348/345, 348/349, 347
See application file for complete search history.

(56) References Cited

U.S. PATENT DOCUMENTS

| 5,841,124 | A * | 11/1998 | Ortyn et al. | 250/201.3 |
| 7,110,035 | B1 * | 9/2006 | Hellstrand | 348/350 |
| 7,343,047 | B2 * | 3/2008 | Aas et al. | 382/255 |

* cited by examiner

*Primary Examiner*—James M Hannett
(74) *Attorney, Agent, or Firm*—Kirton & McConkie; Evan R. Witt

(57) ABSTRACT

The present invention relates to an auto focus method. The peak value range is defined by a search step look-up table and several focusing parameters. By using the auto focus method, the search time and the number of the lens movement steps are largely reduced.

3 Claims, 3 Drawing Sheets

AUTO FOCUS METHOD

FIELD OF THE INVENTION

The present invention relates to an auto focus method, and more particularly to an auto focus method for determining the lens position with the maximum focus value.

BACKGROUND OF THE INVENTION

Currently, image pickup devices such as digital cameras and camera phones are widely used to take photographs. As known, the definition of the object taken by the image pickup device is largely effected by the focusing operation of the image pickup device. In order to achieve high image quality of the object, the focal length should be properly adjusted to focus on the object. In other words, the quality of the digital camera or the camera phone is highly dependent on the auto focus method applied to the digital camera.

Conventionally, there are several means for implementing focus value measurements. A common method for measuring focus value is for example a global search algorithm. Since the global search algorithm captures image in every lens movement step and determines the lens position corresponding to the maximum focus value, the global search algorithm may achieve the most correct search results among these lens position search algorithms. However, the global search algorithm needs too long search time and too many lens movement steps.

Since the lens needs to frequently move back and forth, the lens is readily suffer from mechanical backlash problem and the pot life thereof is shortened. Ideally, the curve plot illustrating the relation between lens search steps versus focus values is smooth. Whereas, if the focus values or sharpness values of the image are affected by noise, the curve plot illustrating the relation between lens search steps versus focus values becomes saw-toothed or rugged. The saw-toothed or rugged curve indicates erroneous judgment of peak position and erroneous focusing operation.

Therefore, there is a need of providing an auto focus method for achieving quick and correct focusing results.

SUMMARY OF THE INVENTION

It is an object of the present invention to provide an auto focus method for achieving quick and correct focusing results.

In accordance with an aspect of the present invention, there is provided an auto focus method for determining a focusing position of a lens. The lens is moved according to a search step look-up table. The auto focus method comprises the steps of: (a) recording a base focus value BFV corresponding to an initial lens position of the lens; (b) moving the lens to a current lens position according to the search step look-up table, and calculating a current focus value CFV corresponding to the current lens position; (c) recording a maximum focus value MFV; (d) calculating a ratio of the current focus value CFV to the base focus value BFV, and up counting a peak value search count by one if the CFV/BFV ratio is greater than a peak value approaching parameter W; (e) discriminating whether the peak value search count is greater than or equal to a peak value range parameter C, and regarding the lens position corresponding to the maximum focus value MFV as the focusing position if the peak value search count is greater than or equal to the peak value range parameter C; (f) discriminating whether a ratio of the maximum focus value MFV to the current focus value CFV is greater than a peak value departing parameter K if the peak value search count is smaller than the peak value range parameter C, and regarding the lens position corresponding to the maximum focus value MFV as the focusing position if the MFV/CFV ratio is greater than the peak value departing parameter K; (g) moving the lens to a next focusing position according to the search step look-up table if the MFV/CFV ratio is not greater than the peak value departing parameter K; and (h) repeating the steps (b) to (g).

Preferably, the search step look-up table, the peak value approaching parameter W and the peak value departing parameter K are determined according to the attributes of the lens.

Preferably, the peak value range parameter C is determined according to the depth-of-field range of the lens.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the above described drawbacks resulting from the global search algorithm, the present invention relates to a novel auto focus method.

First of all, according to the attributes of the lens, multiple lens movement steps are measured and correlated to a search step look-up table. The search step look-up table records all lens movement steps. Generally, every lens has respective search step look-up table. According to the optical principles, there is a depth of field in the vicinity of the focal point, and the images within the depth of field are deemed as sharp images. The sharpness values of the video camera are also called as focus values. As a consequence, the focus value within the depth-of-field range and corresponding to one of multiple lens movement steps is feasible to reduce the search time. Moreover, since the depth-of-field ranges for different optical elements may be superimposed with each other, a specific lens may be moved within another lens' depth-of-field range in order to increase the search speed. Some representative lens movement steps are recorded in the search step look-up table.

In addition to the search step look-up table, other focusing parameters such as a peak value approaching parameter W, a peak value range parameter C and a peak value departing parameter K should be previously preset. The peak value range parameter C is determined according to the depth-of-field range of the lens. The peak value approaching parameter W and the peak value departing parameter K are determined according to attributes of the lens. These parameters W, C and K are obtained experimentally.

Figure 1:
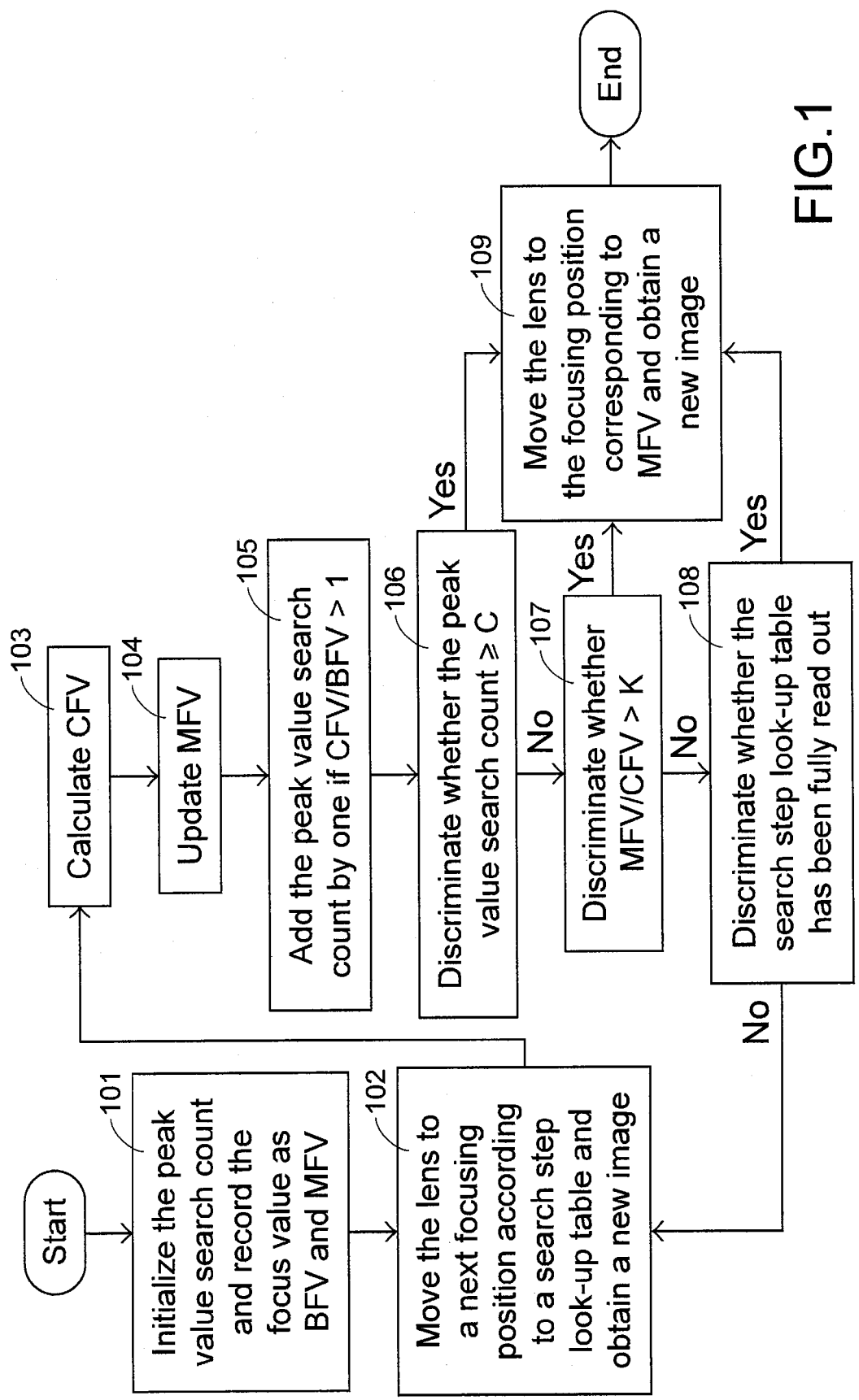
FIG. 1 is a flowchart of an auto focus method according to a preferred embodiment of the present invention.

Hereinafter, a flowchart of an auto focus method according to a preferred embodiment of the present invention will be illustrated as follows with reference to FIG. 1.

First of all, in the Step 101, the peak value search count of the lens is initialized or zeroed, and thus the lens is located in the initial position. The focus value in this initial position is defined as a base focus value (BFV) and also recorded as a maximum focus value (MFV). Subsequently, in the Step 102, the lens is moved to a next focusing position corresponding to succeeding lens movement steps according to the search step look-up table, thereby obtaining a new image in the new focusing position. Then, in the Step 103, the sharpness value or focus value corresponding to this new focusing position is referred as a current focus value (CFV). Then, the current focus value CFV is compared with the maximum focus value MFV, and the larger one is regarded as a new MFV (Step 104). Then, in the Step 105, the ratio of the current focus value CFV to the base focus value BFV (i.e. CFV/BFV) is compared with peak value approaching parameter W. If the CFV/BFV ratio is greater than the peak value approaching parameter W, the peak value search count is up counted by one. Whereas, if the CFV/BFV ratio is not greater than the peak value approaching parameter W, the peak value search count is kept unchanged. Then, if the peak value search count is greater than or equal to the peak value range parameter C (Step 106), the lens is moved to the position corresponding to the maximum focus value MFV and a new image is obtained (Step 109). After the Step 109, the auto focus process is ended. Otherwise, if the peak value search count is smaller than the peak value range parameter C, the ratio of the maximum focus value MFV to the current focus value CFV (i.e. MFV/CFV) is compared with the peak value departing parameter K. If the MFV/CFV ratio is greater than said peak value departing parameter K (Step 107), the lens is moved to the position corresponding to the maximum focus value MFV so as to obtain a new image (Step 109). If the MFV/CFV ratio is not greater than the peak value departing parameter K and the search step look-up table has been fully read out (Step 108), the lens is moved to the position corresponding to the maximum focus value MFV so as to obtain a new image (Step 109). Otherwise, if the MFV/CFV ratio is not greater than the peak value departing parameter K but the search step look-up table has not yet been fully read out, the lens is moved to a next focusing position according to the search step look-up table (Step 102). The above steps 102, 103, 104, 105, 106, 107, 108 and 109 are repeated until any specific focusing condition is satisfied.

Figure 2A:
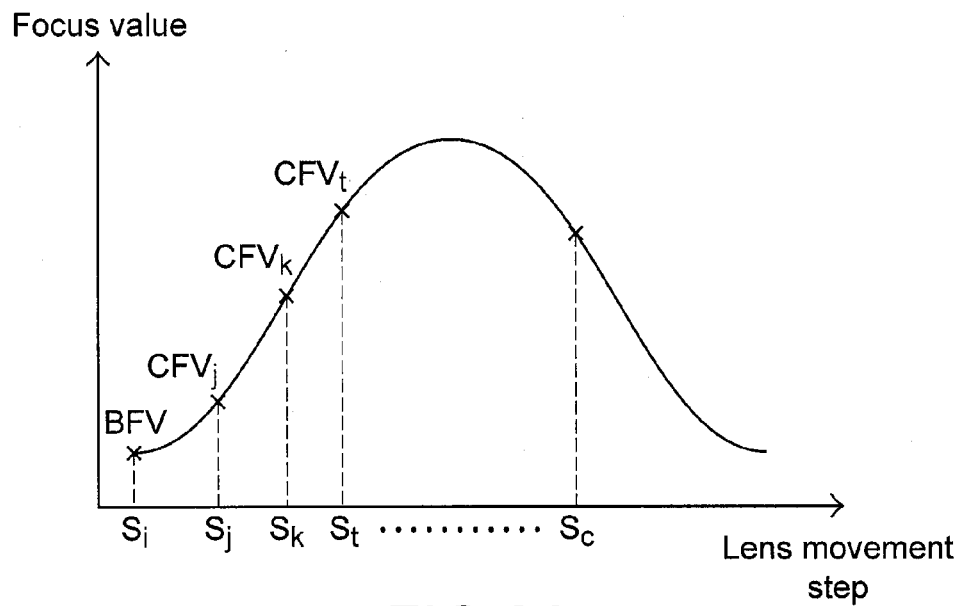
FIGS. 2A and 2B are schematic curve plots illustrating the relation between lens search steps versus focus values according to the concept of the present invention.
Figure 2B:
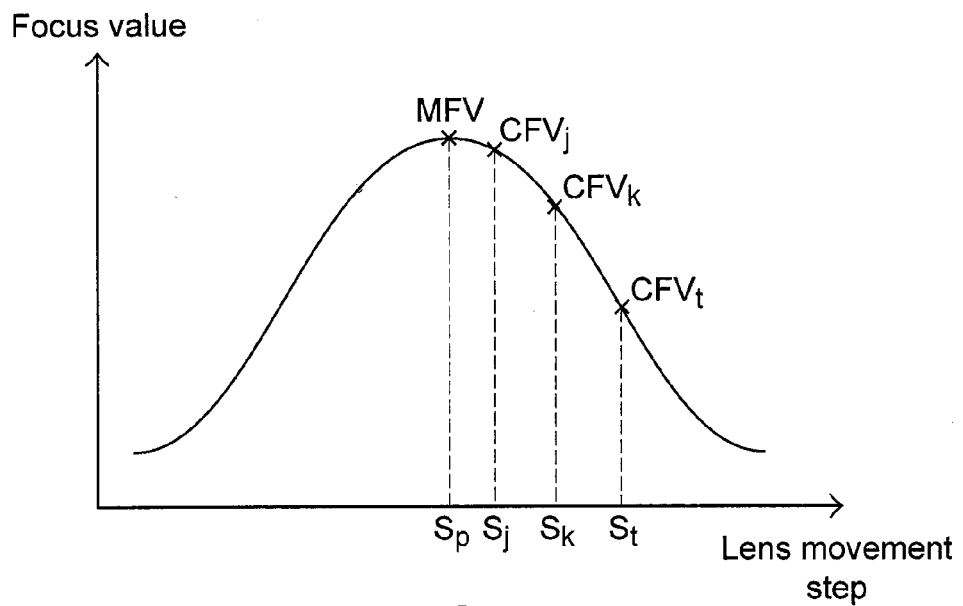

FIGS. 2A and 2B are schematic curve plots illustrating the relation between lens search steps versus focus values according to the concept of the present invention. Hereinafter, the definitions of the peak value approaching parameter W, the peak value range parameter C and the peak value departing parameter K will be illustrated as follows with reference to FIGS. 2A and 2B.

As shown in FIG. 2A, the focus value in the initial position corresponding to the lens movement steps Si is defined as the base focus value (BFV). Corresponding to the lens movement steps Sj, the focus value CFVj is obtained. When the lens is moved to the position corresponding to the Sk lens movement steps, a focus value CFVk is obtained. After undue experiments, it is found that the ratio of the focus value CFVj to the base focus value BFV is smaller than the ratio of the focus value CFVk to the base focus value BFV. That is, an increment of the lens movement steps increases the ratio of the current focus value to the base focus value BFV. When the lens is moved to the position corresponding to the lens movement steps St, a focus value CFVt is obtained. Meanwhile, the ratio of the focus value CFVt to the base focus value BFV, i.e. CFVt/BFV, is slightly greater than the peak value approaching parameter W. That is, the focus value CFVt is close to the maximum focus value (MFV), which corresponds to an optimized lens position. The experiments show that sharp images are obtained after the CFVt/BFV ratio begins to be greater than the peak value approaching parameter W and the lens further moves for a specific number of search steps. The specific number of search steps is referred herein as the peak value range parameter C. In other words, when the lens is moved by C steps from the position corresponding to the St lens movement steps to the position corresponding to the Sc lens movement steps, the peak value is obtained in the range of from St to Sc. As previously described, if the focus values or sharpness values of the image are affected by noise, the curve plot illustrating the relation between lens search steps versus focus values becomes saw-toothed or rugged. That is, the CFV/BFV ratio following the CFVt/BFV ratio which begins to be greater than the parameter W may be smaller than the parameter W. Under this circumstance, the lens should be further moved at a peak value search count greater than or equal to the peak value range parameter C. Since the peak value search count is greater than or equal to the peak value range parameter C, the maximum focus value still lies within the depth-of-field range.

As shown in FIG. 2B, the focus value corresponding to the lens movement steps Si is recorded as the maximum focus value (MFV). When the lens is further moved to the position corresponding to the Sj lens movement steps, a focus value CFVj is obtained. When the lens is further moved to the position corresponding to the Sk lens movement steps, a focus value CFVk is obtained. It is found that the MFV/CFVj ratio is smaller than the MFV/CFVk ratio. That is, an increment of the lens movement steps increases the ratio of the maximum focus value MFV to the current focus value. When the lens is moved to the position corresponding to the lens movement steps St, a focus value CFVt is obtained. In a case that the ratio of the maximum focus value MFV, i.e. MFV/CFVt, is slightly greater than the peak value departing parameter K, the procedure of moving the lens is ended because the focus value corresponding to a next lens movement step begins to obviously depart from the peak value. Under this circumstance, the lens is moved to the focusing position with the maximum focus value MFV and the auto focus process is finished.

Figure 3A:
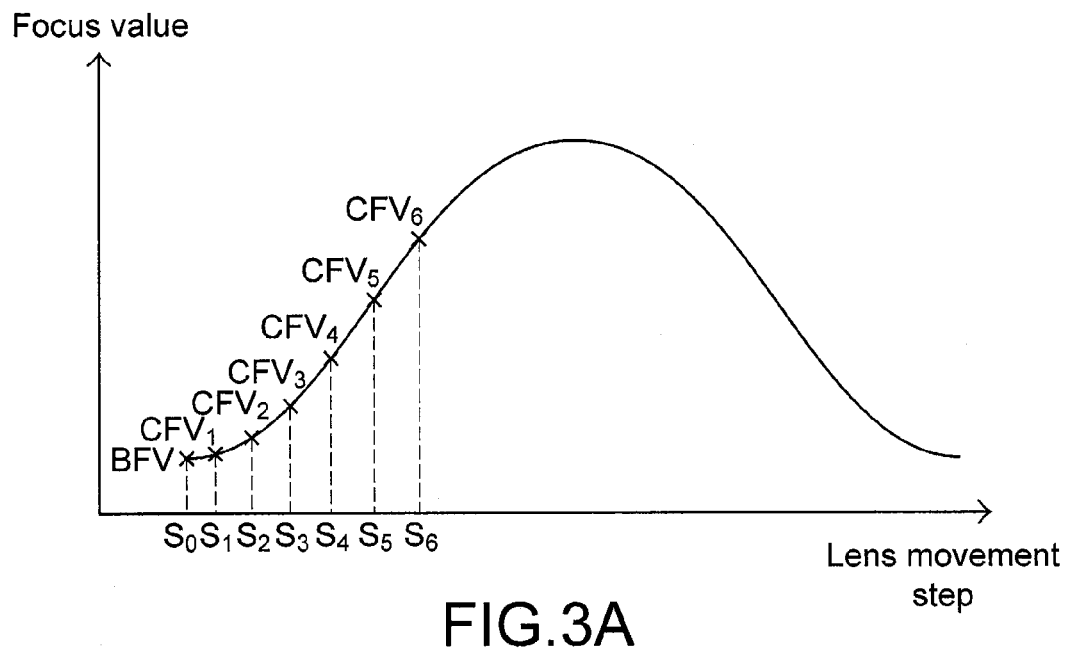
FIGS. 3A and 3B are schematic curve plots illustrating the relation between lens search steps versus focus values according to a preferred embodiment of the present invention.
Figure 3B:
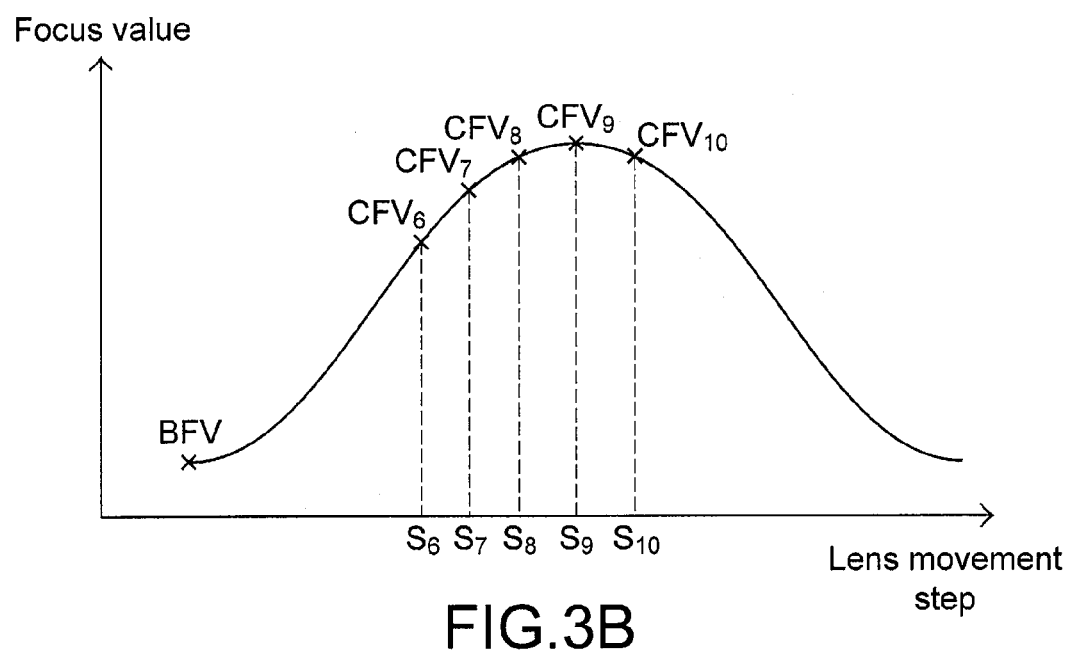

FIGS. 3A and 3B are schematic curve plots illustrating the relation between lens search steps versus focus values according to a preferred embodiment of the present invention. In this embodiment, a search step look-up table is provided. The peak value approaching parameter W is 1.3, the peak value range parameter C is 5 and the peak value departing parameter K is 1.5.

As shown in FIG. 3A, the focus value in the initial position corresponding to the lens movement steps S0 is recorded as the base focus value (BFV), which is also recorded as the maximum focus value MFV. Meanwhile, the peak value search count is equal to 0. According to the search step look-up table, the lens is moved to the position corresponding to the S1 lens movement steps. The focus value corresponding to the S1 lens movement steps is measured as CFV1. It is found that the current focus value CFV1 is greater than the base focus value BFV, i.e. CFV1>BFV. Meanwhile, the current focus value CFV1 is recorded as the maximum focus value MFV. Since the ratio of the focus value CFV1 to the base focus value BFV, i.e. CFV1/BFV, is smaller than the peak value approaching parameter W (=1.3), the peak value search count is kept unchanged (=0). Meanwhile, the peak value search count (=0) is smaller than the peak value range parameter C (=5). Then, the CFV1/BFV ratio is compared with the peak value departing parameter K (=1.5). Since MFV==CFV1, MFV/CFV1=1 and MFV/CFV1<K. Then, according to the search step look-up table, the lens is moved to the position corresponding to the S2 lens movement steps.

The focus value corresponding to the S2 lens movement steps is measured as CFV2. It is found that the current focus value CFV2 is greater than the previous focus value CFV1, i.e. CFV2>CFV1. Meanwhile, the current focus value CFV2 is recorded as the maximum focus value MFV. Likewise, since CFV2/BFV ratio is smaller than the peak value approaching parameter W (=1.3), the peak value search count is also kept unchanged (=0). Meanwhile, the peak value search count (=0) is smaller than the peak value range parameter C (=5). Then, the CFV2/BFV ratio is compared with the peak value departing parameter K (=1.5). Since MFV=CFV2, MFV/CFV2=1 and MFV/CFV2<K. The rest may be deduced by analogy. Afterwards, the lens is moved to the position corresponding to the S5 lens movement steps, and thus MFV=CFV5.

As shown in FIG. 3B, the lens is moved to the position corresponding to the S6 lens movement steps. The focus value corresponding to the S6 lens movement steps is measured as CFV6. It is found that the current focus value CFV6 is greater than the previous focus value CFV5, i.e. CFV6>CFV5. Meanwhile, the current focus value CFV6 is recorded as the maximum focus value MFV. Since the CFV6/BFV ratio is greater than the peak value approaching parameter W (=1.3), the peak value search count is increased from 0 to 1. Meanwhile, the peak value search count (=1) is also smaller than the peak value range parameter C (=5). Then, the CFV6/BFV ratio is compared with the peak value departing parameter K (=1.5). Since MFV=CFV6, MFV/CFV6=1 and MFV/CFV2<K. Then, according to the search step look-up table, the lens is moved to the position corresponding to the S7 lens movement steps. The focus value corresponding to the S7 lens movement steps is measured as CFV7. Meanwhile, the current focus value CFV7 is recorded as the maximum focus value MFV. Since the CFV7/BFV ratio is greater than the peak value approaching parameter W (=1.3), the peak value search count is increased from 1 to 2. The rest may be deduced by analogy. Once the lens is moved to the position corresponding to the S9 lens movement steps, MFV=CFV9. Since the CFV7/BFV ratio is also greater than the peak value approaching parameter W (=1.3), the peak value search count is increased to 4. Then, the lens is moved to the position corresponding to the S10 lens movement steps. The focus value corresponding to the S10 lens movement steps is measured as CFV10. Meanwhile, the current focus value CFV10 is smaller than the maximum focus value MFV. Since the CFV10/BFV ratio is also greater than the peak value approaching parameter W (=1.3), the peak value search count is increased to 5, which is equal to the peak value range parameter C. From the above description, the peak value lies between the CFV6 and CFV10, which corresponding to the lens movement steps S6 to S1. Under this circumstance, the lens is moved to the focusing position with the last recorded maximum focus value MFV (i.e. the focus value CFV9 corresponding to the S9 lens movement steps) and the auto focus process is finished. The influences of MFV/CFV>1 and noise are identical to those described in FIG. 2B, and are not described redundantly herein.

From the above description, since the search step look-up table is established on the basis of the depth-of-field range, the auto focus method of the present invention has reduced search time in comparison with the conventional global search algorithm. Moreover, the peak value range is determined according to the peak value approaching parameter W, a peak value range parameter C and a peak value departing parameter K. The procedure of moving the lens is ended once the upper limit of the peak value range has been searched. As a consequence, the search time is reduced. Even if the sharpness value or focus value is affected by noise, the correct peak value may be effectively determined by the auto focus method of the present invention. Moreover, the sharpness degrees of the same focus values may look different under different scenes. Accordingly, by using the base focus value BFV as a reference focus value, the auto focus method of the present invention is effective to correctly determine the focus value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An auto focus method for determining a focusing position of a lens, said lens being moved according to a search step look-up table, said auto focus method comprising steps of:
   (a) recording a base focus value BFV corresponding to an initial lens position of said lens;
   (b) moving said lens to a current lens position according to said search step look-up table, and calculating a current focus value CFV corresponding to said current lens position;
   (c) recording a maximum focus value MFV;
   (d) calculating a ratio of said current focus value CFV to said base focus value BFV, and up counting a peak value search count by one if the CFV/BFV ratio is greater than a peak value approaching parameter W;
   (e) discriminating whether said peak value search count is greater than or equal to a peak value range parameter C, and regarding the lens position corresponding to said maximum focus value MFV as said focusing position if said peak value search count is greater than or equal to said peak value range parameter C;
   (f) discriminating whether a ratio of said maximum focus value MFV to said current focus value CFV is greater than a peak value departing parameter K if said peak value search count is smaller than said peak value range parameter C, and regarding the lens position corresponding to said maximum focus value MFV as said focusing position if the MFV/CFV ratio is greater than said peak value departing parameter K;
   (g) moving said lens to a next focusing position according to said search step look-up table if the MFV/CFV ratio is not greater than said peak value departing parameter K; and
   (h) repeating the steps (b) to (g).

2. The auto focus method according to claim 1 wherein said search step look-up table, said peak value approaching parameter W and said peak value departing parameter K are determined according to the attributes of said lens.

3. The auto focus method according to claim 1 wherein said peak value range parameter C is determined according to the depth-of-field range of said lens.

* * * * *